United States Patent [19]

Nair

[11] 4,400,310
[45] Aug. 23, 1983

[54] THICK FILM SILVER COMPOSITIONS FOR SILVER TERMINATIONS FOR REDUCED BARIUM TITANATE CAPACITORS

[75] Inventor: K. Manikantan Nair, East Amherst, N.Y.

[73] Assignee: E. I. Du Pont de Nemours and Company, Wilmington, Del.

[21] Appl. No.: 120,839

[22] Filed: Feb. 12, 1980

[51] Int. Cl.$^3$ .............................................. H01B 1/06
[52] U.S. Cl. ................................ 252/514; 252/518; 252/519; 252/520; 252/521; 252/62.3 BT; 357/10; 501/22
[58] Field of Search ............... 252/514, 512, 518, 519, 252/520, 521, 62.3 BT, 62.3 ZB; 361/313, 318, 321, 322, 435; 106/1.12, 1.13, 1.14, 1.23; 501/22, 49

[56] References Cited

U.S. PATENT DOCUMENTS

| | | | |
|---|---|---|---|
| 4,051,074 | 9/1977 | Asada | 252/514 |
| 4,090,009 | 5/1978 | Horowitz | 252/514 |
| 4,096,098 | 6/1978 | Umeya et al. | 252/518 |
| 4,098,949 | 7/1978 | Kosiorek | 252/514 X |
| 4,101,454 | 7/1978 | Kulevichi et al. | 252/514 |
| 4,101,710 | 7/1978 | Marcus | 252/514 |
| 4,160,227 | 7/1979 | Okegami et al. | 252/514 |
| 4,271,236 | 7/1981 | Addieco | 252/519 |
| 4,347,167 | 8/1982 | Payne et al. | 252/520 |

Primary Examiner—Josephine Barr

[57] ABSTRACT

Thick film silver compositions, containing silver powder, glass and certain inorganic materials, useful for silver terminations for reduced barium titanate (RBT) capacitors, are provided. The inorganic materials or their precursors contain ions capable of substituting into the $BaTiO_3$ lattice, existing as surface layers on the RBT bodies, or grains therein, to produce $(Ba_{1-x}M_x')(Ti_{1-y}M_y'')(O_{3-z}A_z)$ where $x<1$, $y<1$, and $z<0.1$. When terminated with these thick film silver compositions, RBT capacitors have excellent dielectric properties.

9 Claims, No Drawings

THICK FILM SILVER COMPOSITIONS FOR SILVER TERMINATIONS FOR REDUCED BARIUM TITANATE CAPACITORS

DESCRIPTION

This invention relates to thick film silver compositions and more particularly to silver termination compositions for reduced barium titanate capacitors.

BACKGROUND ART

Thick film silver compositions useful as silver terminations for reduced barium titanate (RBT) capacitors are old in the art.

In general, such silver compositions contain silver powder, glass, organic vehicle and, optionally, certain inorganic materials such as cuprous oxide, bismuth oxide which function, for example, as adhesion promoters. One such composition, available commercially, contains 70.4% by weight of silver, 2% by weight of glass, 2% by weight of cuprous oxide, the remainder being an organic vehicle. Another such composition, also available commercially, contains 57% by weight of silver, 7% by weight of glass, and 26% by weight of vehicle. These compositions, however, yield capacitors having capacitance density lower than required for certain applications.

Other commercially available silver compositions, useful for terminating RBT capacitors, produce capacitors of widely varying properties when fired between 750°–950° C. Some of the dielectric properties of these capacitors are shown below and serve as a basis for showing the need for improved termination compositions.

| Capacitor[a] | Voltage (volts DC) | DF[b] (% max.) | Max. $CD_2$[c] ($nF/in^2$) | Max. IR[d] (mega ohm) |
|---|---|---|---|---|
| Centralab Ultra-Kap (I and II) | 16 | 7[e] | 625[e] | <10 |
| RMC Magna-caps | 12 | 5[f] | 934[f] | <10 |
| Erie Trans-caps | 25 | 10[g] | 338[g] | <100 |
| Sprague "Hypercon" | 16 | — | 554[e] | <100 |

[a]RBT body terminated with commercial silver compositions
[b]Dissipation factor
[c]Maximum capacitance density
[d]Maximum insulation resistance, measured at the working voltage
[e]Tested at 0.1 volt root mean square (RMS), 1 KHz, 25° C.
[f]Tested at 0.05 volt RMS, 1 KHz, 25° C.
[g]Tested at 0.075 volt RMS, 1 KHz, 25° C.

DISCLOSURE OF THE INVENTION

The thick film silver composition of this invention consists essentially of a dispersion in an organic vehicle of 30–90 parts by weight of silver powder, 1–20 parts by weight of glass having a softening point below 600° C. and an absolute viscosity at the firing temperature of less than 106, and 0.1–30 parts by weight of an inorganic material or precursor thereof capable of substituting into the $BaTiO_3$ lattice existing as the surface layers on the reduced barium titanate (RBT) bodies or grains therein to produce $(Ba_{1-x}M_x')(Ti_{1-y}M_y'')(O_{3-z}A_z)$, wherein $x<1$, $y<1$ and $z<0.1$ and wherein the inorganic material contains at least one of M', M" and A ions.

These silver compositions are useful for terminating RBT capacitors and result in improvements in the combination of such measured properties as capacitance density (CD), insulation resistance (IR) and dissipation factor (DF).

DESCRIPTION OF THE INVENTION

The thick film silver compositions of this invention contain 30–90 parts by weight, based on the total weight of the composition, of silver powder and preferably 45–70 parts.

The silver powders can have various morphologies such as flake or nonflake. The nonflake powders can be irregularly shaped or spherical. Preferably, flake silver powders are utilized. By flake morphology is meant a silver powder whose predominant shape is flake as determined by scanning electron microscopy. Such flake silver powders typically can have a surface area of approximately $1m^2/g$ and solids content of approximately 99.3% by weight.

Another component of the silver compositions of this invention is a low softening point glass at the 1–20 parts by weight level and preferably at the 1–10 parts level and more preferably at the 1–2 parts level. By low-softening point glass is meant a glass having a softening point below 600° C. and preferably below 500° C., as measured by the conventional fiber elongation method (ASTM C 338-57).

The glass utilized in this invention also has to have a low viscosity at the firing temperature. Glasses having an absolute viscosity of less than $10^6$ at the firing temperature satisfy the requirement for these silver compositions of facilitating the transport of the inorganic materials from the composition into the interior of the substrate (RBT) body along the grain boundaries and voids.

Typical examples of glasses meeting the above criteria are lead bismuth borate glasses containing, by weight %, $Bi_2O_3$, 40–60; PbO, 28–37; and $B_2O_3$, 3–32. A particularly preferred glass contains $Bi_2O_3$, 60%; PbO, 37%; and $B_2O_3$, 3%.

The glasses are prepared by conventional glass-making techniques, by mixing the desired components (or precursors thereof, e.g., $H_3BO_3$ for $B_2O_3$) in the desired proportions and heating the mixture to form a melt. As is well known in the art, heating is conducted to a peak temperature and for a time such that the melt becomes entirely liquid, yet gaseous evolution has ceased. In the present work the components are premixed by shaking in a jar and then melted in a Pt crucible at approximately 1000° C. The melt is then poured into cold water and, after separation from the quench water, the crude frit is freed from residual water by drying in an oven or by displacing the water by rinsing with methanol. The crude frit is then ball-milled for 40 hours in Freon TF solvent (a registered trademark of E. I. du Pont de Nemours and Co.) using alumina balls. After discharging the milled frit slurry from the mill, the excess solvent is removed by decantation and the frit powder is air dried at room temperature. The dried powder is then screened through a 60-mesh screen to remove any large particles.

The incorporation of certain inorganic materials or their precursors, capable of substituting into the $BaTiO_3$ lattice, has lead to the silver compositions of this invention and affords terminated capacitors showing improvements in a combination of measured properties not heretofore available.

These inorganic materials are present to the extent of 0.1–30 parts by weight based on the weight of the final composition and preferably to the extent of 1–10 parts. Some especially preferred compositions contain approximately 1, 2, 3, 4 and 5 parts of the inorganic materials.

The inorganic materials contain at least one of the following ions: M', M", A, where M' and M" represent metals. During firing of the silver compositions of this invention on the RBT bodies, the barium titanate lattice is modified to produce $(Ba_{1-x}M'_x)(Ti_{1-y}M''_y)(O_{3-z}A_z)$, where $x<1$, $y<1$ and $z<0.1$ Substitution by various cations (M' and M") in place of the $Ba^{+2}$ and $Ti^{+4}$ ions, respectively, or both M' and M" for both barium and titanium ions or different M' and M" ions simultaneously for $Ba^{+2}$ and $Ti^{+4}$, respectively, and by various anions (A) for oxygen, into a perovskite lattice such as $BaTiO_3$ has been described by R. Roy in the Journal of the American Chemical Society, Volume 37, 581 (1954). Ions which satisfy the charge and size criteria for substitution include, for M', $Ca^{+2}$, $Ba^{+2}$, $Sr^{+2}$, $Pb^{+2}$, $Rb^{+2}$, $Cs^{+2}$ and $Fe^{+3}$, for M", $Ge^{+4}$, $Ti^{+4}$, $Zr^{+4}$, $Zn^{+2}$ and $Cr^{+3}$, and, for A, $F^-$. Specific inorganic materials useful in the silver compositions of this invention include $CaZrO_3$, $SrTiO_3$, $BaTiO_3$, $Cr_2O_3$ and $CaF_2$.

Precursors for the inorganic materials can also be utilized. A combination of CaO and $ZrO_2$, for example, affords $CaZrO_3$ during firing.

One can also utilize noncrystalline (glassy) materials which afford crystalline materials by devitrification during the firing-cooling cycle in the preparation of the capacitors. This devitrification process can yield either a single crystalline phase having the same composition as the precursor noncrystalline material or multiple crystalline phases with different compositions from that of the precursor glass. An example of such a noncrystalline precursor of the inorganic material of this invention is a glass containing $Pb_3O_4$ and $GeO_2$ as the component oxides in the weight ratio of 60–75 to 40–25. A preferred lead germinate glass is based on 78.5% $Pb_3O_4$ and 21.5% $GeO_2$.

The devitrifiable precursors of the inorganic materials can be utilized alone or in combination with the inorganic materials themselves; such a combination is preferred utilizing 1–15 parts of devitrifiable precursor and 0.1–15 parts of the inorganic material.

Optionally, the compositions of this invention can also contain certain other inorganic materials which, while not of the type containing ions capable of substituting into the $BaTiO_3$ lattice, play a beneficial role in improving properties. For example, cuprous oxide can be added at the approximately 1–2 parts by weight level to act as an adhesion promoter.

The inorganic solids content of the silver composition of this invention (silver, glass and inorganic material or precursor thereof) is dispersed in an organic vehicle to form printable composition pastes. The ratio of the inorganics to vehicle is in the range of from 19:1 to 1:9 by weight. Preferably, the composition contains 65–80 parts by weight of inorganic solids and 20–35 parts of vehicle.

Any inert liquid can be used as the vehicle. Water or any one of various organic liquids, with or without thickening and/or stabilizing agents and/or other common additives, can be used as the vehicle. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethyl cellulose, in solvents such as pine oil and the monobutyl ether of ethylene glycol monoacetate. The vehicle can contain or be composed of volatile liquids to promote fast setting after application to the substrate.

A preferred vehicle is based on ethyl cellulose and beta-terpineol. The pastes are conveniently prepared on a three-roll mill. A preferred viscosity range of these compositions is approximately 50–100 Pa·S, measured on a Brookfield HBF viscometer using #4 spindle at 10 rpm and the amount of vehicle utilized is determined by the final desired paste viscosity.

The silver compositions of this invention can be printed as film onto the substrates either by using an automatic printer or a hand printer in the conventional manner. Preferably, automatic screen stenciling techniques are employed, using a 200-mesh screen. The compositions generally are printed on both sides of the RBT discs, the resulting printed patterns are allowed to level out, dried at elevated temperatures such as at 125° C. for approximately 15 minutes, and fired in air in a belt furnace at a peak temperature of approximately 825°–925° C. for 10 minutes, the total firing cycle being 60–90 minutes.

Although the exact mechanism of property improvements in RBT capacitors through the addition of the claimed silver compositions is not known, certain methods of intergranular layer production can be postulated.

Reduced barium titanate bodies comprise many small grains made of $BaTiO_{3-x}$. These are produced from the insulating ceramic $BaTiO_3$ by reduction in a reducing atmosphere at high temperatures. The product of the reduction is a semiconductor, $BaTiO_{3-x}$, resulting from the presence of excess electrons after the removal of some oxygen atoms. It is such RBT bodies to which the silver compositions of this invention can be applied to generate an assembly of miniature capacitors with silver electrodes (terminations) on both sides. During the thermal processing (firing) of the silver compositions on the RBT bodies, a thin surface layer of each semiconductor grain is reoxidized to the dielectric $BaTiO_3$ thus producing a multitude of capacitors within the capacitor body. The body becomes a series parallel assembly of miniature capacitors.

The addition of the claimed inorganic material alters the intergranular $BaTiO_3$ layers during their formation. The low-softening point, low viscosity glass utilized in the silver compositions of this invention carries the inorganic material, along with some of the silver powder, to the grain boundaries where ion substitution occurs and the formation of a thin, continuous intergranular dielectric layer is enhanced. This is shown schematically below:

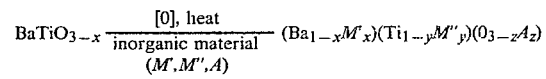

The number and properties of the intergranular layer capacitors thus produced are dependent on the viscosity of the glass and the type of inorganic material utilized as part of the silver composition. The inorganic material can and does affect the electrical properties of the capacitors and, by generating a variety of thin, continuous intergranular dielectric layers, leads to capacitors having improved dielectric properties such as capacitance density, dissipation factor, insulation resistance and frequency response.

There is an additional factor which can affect the development of some desirable dielectric properties. This factor is the ratio of the silver powder to glass incorporated into the silver compositions. It was found that as the amount of silver is increased with respect to the amount of glass, the capacitance density is increased with a concomitant decrease in insulation resistance. A rational explanation of these phenomena can be derived from scanning electron microscopy/energy dispersion X-ray analysis and dot mapping of freshly fractured capacitor bodies. These analyses showed silver migration, facilitated by the low softening point, low viscosity glasses present in the silver compositions, throughout the capacitor body into the grain boundaries.

These analyses also provided evidence that the inorganic materials are also transported into the capacitor body and deposited at the grain boundary dielectric layers where they can remain as is or react with the $BaTiO_3$ as discussed above.

It is noteworthy, that the continuous thin intergranular dielectric layers formed during the oxidation-substitution cycle are essential for the property improvements obtainable with the compositions of this invention and that all three claimed components, silver powder, glass and inorganic material or its precursor, must be present during the firing step. If one were to be able to prepare an RBT body with intergranular layers of substituted $BaTiO_3$ and then applied a conventional silver/glass termination composition, the improvements obtained with the silver composition of this invention would not be realized. The desired combination of high capacitance density and insulation resistance and low dissipation factor is dependent on the thin continuous substituted intergranular dielectric layers in the capacitor and these are formed only during the firing step leading to the oxidation-substitution reactions occurring upon the transport to the grain boundaries of the claimed inorganic materials by the low viscosity glasses.

Capacitance and dissipation factors are measured using Hewlett-Packard's HP 4274A multi-frequency LCR meter, while insulation resistance is measured using super megohm meter Model RM170 (Biddle Instruments, AVO Ltd., U.K.). Each number is the average of at least 10 measurements. Insulation reistance measurements are made after charging the capacitor with the respective working voltage for 1 minute. Measurements are made in both directions and, on the average, no differences of order of magnitude in IR are found. In general, specifications for CD and IR are established as minimum values and, for DF, as maximum permissible values for a given use.

The silver terminated RBT capacitors find use in a variety of low voltage microcircuit applications. These applications include use in automotive ignitions, automotive radios, computers, mobile radios, and home entertainment equipment such as television receivers and television games.

In the Examples below, illustrating the invention, all parts are by weight unless otherwise specified.

EXAMPLES 1-4

These Examples, utilizing commercial RBT bodies with the silver termination compositions of this invention illustrate the improvements in the combined dielectric properties obtainable, as compared to the commercially available prior art compositions discussed in the Background Art section.

The compositions are prepared, applied to both sides of the RBT discs and fired as described above 850° C. The Table below gives compositional information and dielectric properties for capacitors terminated with different silver compositions.

|  | Example | | | |
|---|---|---|---|---|
|  | 1 | 2 | 3 | 4 |
| silver composition (parts) | | | | |
| silver[1] | 56 | 56 | 63.3 | 63.3 |
| glass[2] | 2.2 | 2 | 1.5 | 1.0 |
| inorganic material | | | | |
| calcium zirconate | 2 | 2 | 1 | 1 |
| other | $Cr_2O_3(0.1)$ | $FeF_3(0.5)$ | — | — |
| $Cu_2O$ | — | — | 1 | 1 |
| vehicle[3] | balance | balance | balance | balance |
| RBT body (grain size, $\mu m$) | 7–10 | 2–5 | 5–7 | 10–30 |
| dielectric properties | | | | |
| $CD^4(nF/in^2)$ | 1733 | 1068 | 1520 | 6920 |
| $DF^4$(% max) | 9 | 3.5 | 5.8 | 3.4 |
| $IR^5$(meg $\Omega$) | >5 | >$10^4$ | >$10^2$ | >1 |

[1]Flake silver, surface area of approximately 1 m²g.
[2]Prepared from $Bi_2O_3$ (58.6 parts), PbO (36.2 parts), and $H_3BO_3$ (5.2), resulting in a glass having component oxides (parts): $Bi_2O_3$(60), PbO(37), and $B_2O_3$(3)
[3]Ethyl cellulose, having an alkoxyl content of 47.5–49.0 weight % and a solution viscosity of 18–24 centipoises as determined as a 5% solution in a 80/20 (by weight) mixture of toluene/ethanol after drying at 100° C. for 30 minutes, 11 parts, dissolved in 89 parts of $\beta$-terpineol
[4]Measured at 0.1 volt RMS, 1 KHz, 25° C.
[5]Measured at the working voltage of 16 volts for Examples 1-3 amd 3 volts for Example 4.

For Example 1, the quantities shown above are combined and, prior to the addition of the vehicle, soya lecithin, 0.5 part; diethyl oxalate, 0.1 part; and Tallicin No. 120, (a wetting agent commercially available from Pflaumber Brothers, Norristown, PA), 0.2 part, are added. With the addition of 31.9 parts of the vehicle, the total composition is at 95 parts. After roll-milling, the viscosity is measured and adjusted to the final desired value with the addition of vehicle or $\beta$-terpineol and the composition is brought to 100 parts.

EXAMPLES 5-8

Examples 5–8 illustrate the utilization of a devitrifiable precursor of an inorganic material in conjunction with other inorganic materials.

The compositions are prepared, applied to both sides of the RBT discs and fired as described above. The Table below gives compositional information and dielectric properties for capacitors terminated with different silver compositions. The printed compositions are fired at a peak temperature of 875° C. for 10 minutes.

|  | Example | | | |
|---|---|---|---|---|
|  | 5 | 6 | 7 | 8 |
| silver composition (parts) | | | | |
| silver[1] | 63 | 63 | 63 | 63 |
| glass[2] | 1 | 1 | 1 | 1 |
| inorganic material | | | | |
| devitrifiable glass[6] | 3 | 3 | 3 | 3 |
| calcium zirconate | — | 1 | — | 1 |
| $Cr_2O_3$ | 0.1 | 0.1 | 0.1 | 0.1 |
| $Cu_2O$ | — | — | 1 | 1 |
| vehicle[3] | balance | balance | balance | balance |
| RBT body (grain size, $\mu m$) | 7–10 | 7–10 | 7–10 | 7–10 |

-continued

| | Example | | | |
|---|---|---|---|---|
| | 5 | 6 | 7 | 8 |
| dieletric properties | | | | |
| CD[4](nF/in$^2$) | 497 | 677 | 368 | 447 |
| DF[4] (%) | 5.5 | 6.5 | 3.6 | 5.8 |
| IR[5](Ω) | >10$^{11}$ | >10$^{10}$ | >10$^{10}$ | >10$^{11}$ |

Footnotes 1-4: See footnotes at Examples 1-4.
[5]Measured at the working voltage of 16 volts.
[6]A lead germinate (Pb$_5$Ge$_3$O$_{11}$) glass having, as its component oxides, Pb$_3$O$_4$, 78.5 weight % and GeO$_2$, 21.5 weight %.

EXAMPLES 9-11

Examples 9-11 illustrate the significant effect of varying the silver-glass ratio on dielectric properties. The silver compositions are prepared as described above, printed on 16 volt RBT bodies having a grain size of 7-10 μm, and fired at a peak temperature of 850° C. for 10 minutes.

The Table below gives compositional information and dielectric properties for capacitors terminated with different silver compositions.

| | Example | | |
|---|---|---|---|
| | 9 | 10 | 11 |
| silver composition (parts) | | | |
| silver[1] | 63.3 | 63.3 | 63.3 |
| glass[2] | 2.1 | 1.5 | 1.0 |
| inorganic material (calcium zirconate) | 1 | 1 | 1 |
| Cu$_2$O | 1 | 1 | 1 |
| vehicle[3] | balance | balance | balance |
| silver/glass ratio | 30.1 | 42.2 | 63.3 |
| dielectric properties | | | |
| CD[4](nF/in$^2$) | 1069 | 1330 | 1473 |
| DF[4] (%) | 8.9 | 10.0 | 10.7 |
| IR[5](Ω) | >10$^{10}$ | 10$^7$-10$^{10}$ | 10$^6$-10$^{11}$ |

Footnotes 1-5: See footnotes at Examples 5-8

I claim:

1. A thick film silver composition consisting essentially of a dispersion in an organic vehicle of:
   (A) 30-90 parts by weight, based on the weight of the dispersion, of silver powder;
   (B) 1-20 parts by weight, based on the weight of the dispersion, of glass having a softening point below 600° C. and an absolute viscosity at the firing temperature of less than 10$^6$; and
   (C) 0.1-30 parts by weight, based on the weight of the dispersion, of inorganic material or precursor thereof containing one or more ions (M', M" or A) capable of substituting into a BaTiO$_3$ lattice to produce compounds of the type

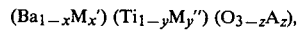
   $(Ba_{1-x}M_x')(Ti_{1-y}M_y'')(O_{3-z}A_z)$, wherein
   M' is selected from the group consisting of Ca$^{+2}$, Ba$^{+2}$, Sr$^{+2}$, Pb$^{+2}$, Rb$^{+2}$, Cs$^{+2}$ and Fe$^{+3}$;
   M" is selected from the group consisting of Ge$^{+4}$, Ti$^{+4}$, Zr$^{+4}$, Zn$^{+2}$ and Cr$^{+3}$;
   A is F$^-$; and
   x<1, y<1 and z<0.1.

2. A thick film silver composition consisting essentially of the composition of claim 1 in which (A) is 45-70 parts by weight, (B) is 1-10 parts by weight, and (C) is 1-10 parts by weight of the composition.

3. The composition of claim 1 wherein the silver powder is present to the extent of 45-70 parts.

4. The composition of claim 1 wherein the glass is present to the extent of 1-10 parts parts.

5. The composition of claim 1 wherein the glass is lead bismuth borate.

6. The composition of claim 1 wherein the precursor of the inorganic material is devitrifiable glass.

7. The composition of claim 6 wherein the devitrifiable glass is lead germinate.

8. The composition of claim 6 wherein the devitrifable glass is present together with the inorganic material.

9. A reduced barium titanate capacitor terminated with the silver composition of claim 1.

* * * * *